United States Patent [19]
Emmons

[11] Patent Number: 5,186,681
[45] Date of Patent: Feb. 16, 1993

[54] AIRCRAFT CABIN PRESSURE CONTROL FOR ASCENTS AND DESCENTS

[75] Inventor: Floyd R. Emmons, West Hartford, Conn.

[73] Assignee: United Technologies Corporation, Hartford, Conn.

[21] Appl. No.: 768,505

[22] Filed: Sep. 30, 1991

[51] Int. Cl.$^5$ .............................................. B64D 13/04
[52] U.S. Cl. ...................................................... 454/74
[58] Field of Search ............................... 454/71, 72, 74

[56] References Cited

U.S. PATENT DOCUMENTS

| | | | |
|---|---|---|---|
| 3,376,803 | 7/1966 | Emmons | 454/74 |
| 3,473,460 | 1/1968 | Emmons | 454/74 |
| 3,577,902 | 5/1971 | Gardner | 454/74 X |
| 4,553,474 | 11/1985 | Wong et al. | 454/74 |

Primary Examiner—Harold Joyce
Attorney, Agent, or Firm—Patrick J. O'Shea

[57] ABSTRACT

The rate of change of cabin air pressure in an aircraft cabin during aircraft ascent and descent is controlled as a function of a ratio which is equal to $(P_{ld}-P_c)/(P_{ld}-P_a)$ during descent, and is equal to $(P_{cc}-P_c)/(P_{cr}-P_a)$ during ascent, where $P_{ld}$ is ambient pressure at the aircraft landing site, $P_c$ is cabin pressure, $P_a$ is external aircraft ambient pressure, $P_{cc}$ is cabin pressure at cruise altitude, and $P_{cr}$ is ambient pressure at cruise altitude. A set point value for the ratio is computed throughout aircraft ascent and descent, and compared to the ratio to schedule a variable flow area of an outflow valve in order to drive the difference (i.e., the error) between the ratio and the desired value for the ratio to zero. By using an adjustable value for the desired set point, control of cabin pressure rate of change is improved during ascent and descent, since the cabin pressure rate of change is maintained at a reduced, linear rate, thereby providing a more comfortable environment for passengers.

10 Claims, 9 Drawing Sheets

AIRCRAFT CABIN PRESSURE CONTROL FOR ASCENTS AND DESCENTS

TECHNICAL FIELD

This invention relates to controlling aircraft cabin pressure and more particularly to computing an adjustable set point reference for the cabin pressure rate of change during aircraft ascents and descents.

BACKGROUND ART

Air pressure within an aircraft cabin is controlled during ascents and descents as a function of: ambient pressure, aircraft cabin pressure and the pressure at the aircraft landing site. Control is typically performed by an automatic cabin pressure controller.

As described in U.S. Pat. No. 3,473,460 to Emmons, and assigned to the assignee of the present invention, an aircraft is designed to withstand a maximum pressure differential between the cabin and ambient pressures. The '460 patent discloses a system where the desired rate of cabin pressure change, $d(P_{cd})/dt$ is computed as a function of a ratio $DP_c/DP_a$, where:

$DP_c$ = the remaining change in cabin pressure during either an ascent or descent; and $DP_a$ = the remaining change in ambient pressure during either an ascent or descent;

The '460 patent discloses controlling the rate of cabin pressure change and adjusting the rate so if the aircraft slows its ascent/descent rate, the rate of cabin pressure change will also slow. Similarly if the aircraft increases its ascent/descent rate, the rate of cabin pressure change will also increase. This ensures the aircraft fuselage does not exceed a predetermined maximum pressure differential between the cabin pressure and external ambient pressure.

However, the '460 patent uses a function generator (item 33, FIG. 1) having a single, nonadjustable operating line as a function of $DP_a$ to provide a set point for the desired rate of cabin pressure change, $d(P_{cd})/dt$. Setting the desired rate of cabin pressure change based upon this single operating line for an infinite number of possible cabin pressure ascent and descent profiles, leads to a sacrifice in the control of cabin pressure since the desired rate of cabin pressure change is constrained to take on values along the single nonadjustable operating line of the function generator.

DISCLOSURE OF THE INVENTION

An object of the present invention is to provide an aircraft cabin pressure controller having an adjustable set point reference value for the cabin pressure rate of change during aircraft ascent and descent.

According to the present invention, the rate of change of aircraft cabin pressure during aircraft ascent and descent is controlled as a function of the difference between (1) a ratio which equal to the remaining change in cabin pressure divided by the remaining change in ambient pressure (i.e., $DP_c/DP_a$), and (2) a set point reference value which is a function of the remaining change of ambient pressure and the initial value of the remaining change in cabin pressure at the start of the ascent or descent; the difference value is summed with a constant value indicative of the desired initial cabin pressure rate of change to provide an adjustable set point reference value, the adjustable set point reference value is a set point for the actual cabin pressure rate of change and is computed at successive intervals through out the ascent and descent.

Using an adjustable reference as a set point for controlling the cabin pressure rate of change produces a more comfortable environment for passengers, since cabin pressure is changed at a reduced, more constant, linear rate during aircraft ascent and descent.

These and other objects, features and advantages of the present invention will become more apparent in light of the following detailed description of a best mode embodiment thereof as illustrated in the accompanying drawings.

BEST MODE FOR CARRYING OUT THE INVENTION

Figure 1:
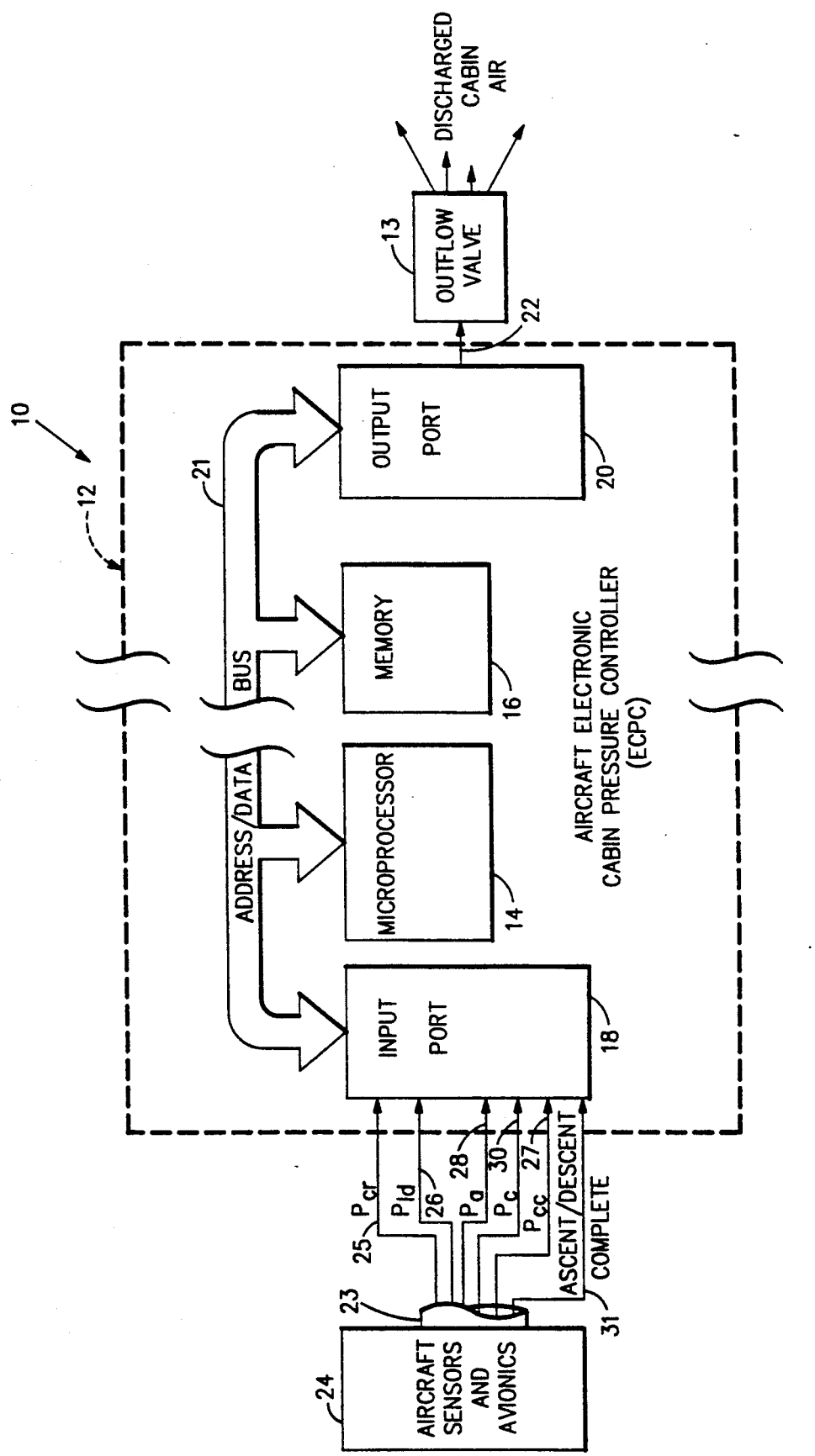
FIG. 1 is a functional block diagram of an aircraft electronic cabin pressure controller (ECPC) embodiment according to the present invention.

FIG. 1 is a functional block diagram an aircraft cabin pressure system 10 according to the present invention. The system 10 includes an electronic cabin pressure controller 12 (hereinafter "controller") and an outflow valve 13. The controller 12 includes: a microprocessor 14 (e.g., Intel 80186, or Motorola 68020), memory 16 (e.g., PROM, RAM), and input/output ports 18,20 which include analog-to-digital and digital-to-analog converters. The elements are interconnected through an address/data bus 21. The controller provides an output command signal on a line 22 to the outflow valve 13 which has a variable flow area through which pressurized cabin air is discharged to regulate actual cabin pressure. An example of such a valve is disclosed in U.S. Pat. No. 3,740,006 to Maher, and assigned to the assignee of the present invention.

Throughout this disclosure various signals will be continuously referred to, and in an effort to facilitate the disclosure the following nomenclature information is provided:

| NOMENCLATURE TABLE | |
|---|---|
| VARIABLE | EXPLANATION |
| $C_f$ | Correction factor |
| $d(P_{cd})/dt$ | Adjustable set point reference for the cabin pressure rate of change. |

-continued

| NOMENCLATURE TABLE | |
|---|---|
| VARIABLE | EXPLANATION |
| ECPC | Electronic Cabin Pressure Controller (i.e., the controller) |
| M | Ascent/descent starting point factor |
| $P_a$ | External aircraft ambient pressure |
| $P_c$ | Cabin pressure |
| $P_{cr}$ | Ambient pressure at cruise altitude |
| $P_{cc}$ | Cabin Pressure at cruise altitude |
| $P_{cd}$ | Desired cabin pressure |
| $P_{ld}$ | Ambient pressure at the aircraft landing site |
| $P_r$ | Desired value of the ratio $DP_c/DP_a$ |
| $DP_a$ | = $(P_{ld} - P_a)$ during a descent |
|  | = $(P_{cr} - P_a)$ during an ascent |
| $DP_c$ | = $(P_{ld} - P_c)$ during a descent |
|  | = $(P_{cc} - P_c)$ during an ascent |

The controller 12 receives aircraft data from aircraft sensors and avionics 24; the data includes: ambient pressure at the aircraft cruise altitude ($P_{cr}$) on a line 25, ambient pressure at the aircraft landing site ($P_{ld}$) on a line 26, cabin pressure at cruise altitude ($P_{cc}$) on a line 27, sensed ambient pressure ($P_a$) on a line 28, sensed cabin pressure ($P_c$) on a line 30, and a signal on a line 31 indicative of whether the aircraft ascent/descent is complete. These six signals may be provided over the aircraft's digital data bus (e.g., ARINC 429, ARINC 629 or MIL-STD-1553) (not shown) if so equipped, or from dedicated electrical lines presented to the controller, or in any other appropriate manner.

The present invention is best disclosed by first functionally describing the desired operation of the system, and then illustrating an embodiment. Therefore a functional description of the present invention will be now be provided.

The controller 12 acts to maintain the magnitude of the cabin pressure rate of change at a value less than an adjustable set point reference. The expression for the adjustable set point reference is:

$$d(P_{cd})/dt = C_1 + C_f \quad \text{(Eq. 1)}$$

where $d(P_{cd})/dt$ = adjustable set point reference for desired cabin pressure rate of change, $C_1$ = 500 feet/min for ascent, or
     = −300 feet/min for descent, $C_f$ = a correction factor.

The correction factor, $C_f$ is defined as:

$$C_f = K_1 \cdot ((DP_c/DP_a) - P_r) \quad \text{(Eq. 2)}$$

where:

$K_1$ = a gain factor (e.g., 0.75 psi/minute)

$DP_c$ = $P_{ld} - P_c$ during a descent
     = $P_{cr} - P_c$ during an ascent $DP_a$ = $P_{ld} - P_a$ during a descent
     = $P_{cc} - P_a$ during an ascent $P_r$ = a set point value (i.e., a desired value) for $(DP_c/DP_a)$ When the ratio $(DP_c/DP_a)$ deviates from the set point value $P_r$, $C_f$ becomes non-zero to add the necessary correction factor in order to drive the difference between the ratio $(DP_c/DP_a)$ and $P_r$ towards zero.

$P_r$ is derived from aircraft ascent and descent profiles, and has a different equation for each of the two phases. Furthermore, each aircraft type may have different equations for $P_r$ since each type typically ascends/descends in a slightly different manner. As an example, the long haul Boeing 747 series aircraft certified to operate up to approximately 45,000 feet, descends in a different manner than the short haul Boeing 737 series aircraft which is certified up to approximately 35,000 feet. Both in turn ascend/descend in a different manner than a Short Takeoff and Landing (STOL) aircraft such as the DASH-7 manufactured by the De Havilland Corp. Therefore, based upon the typical descent profile for a particular aircraft type, an equation can be derived for $P_r$. However, it should be understood it is possible to use one standard equation for all large aircraft, but the trade-off is the equation may not have the accuracy you desire from the controller since the equation covers such a broad range of aircraft. Therefore, embodiments of the present invention use different equations to define $P_r$ during ascent and descent for each aircraft type (e.g., Boeing 777, Airbus 340, etc.).

Figure 3:
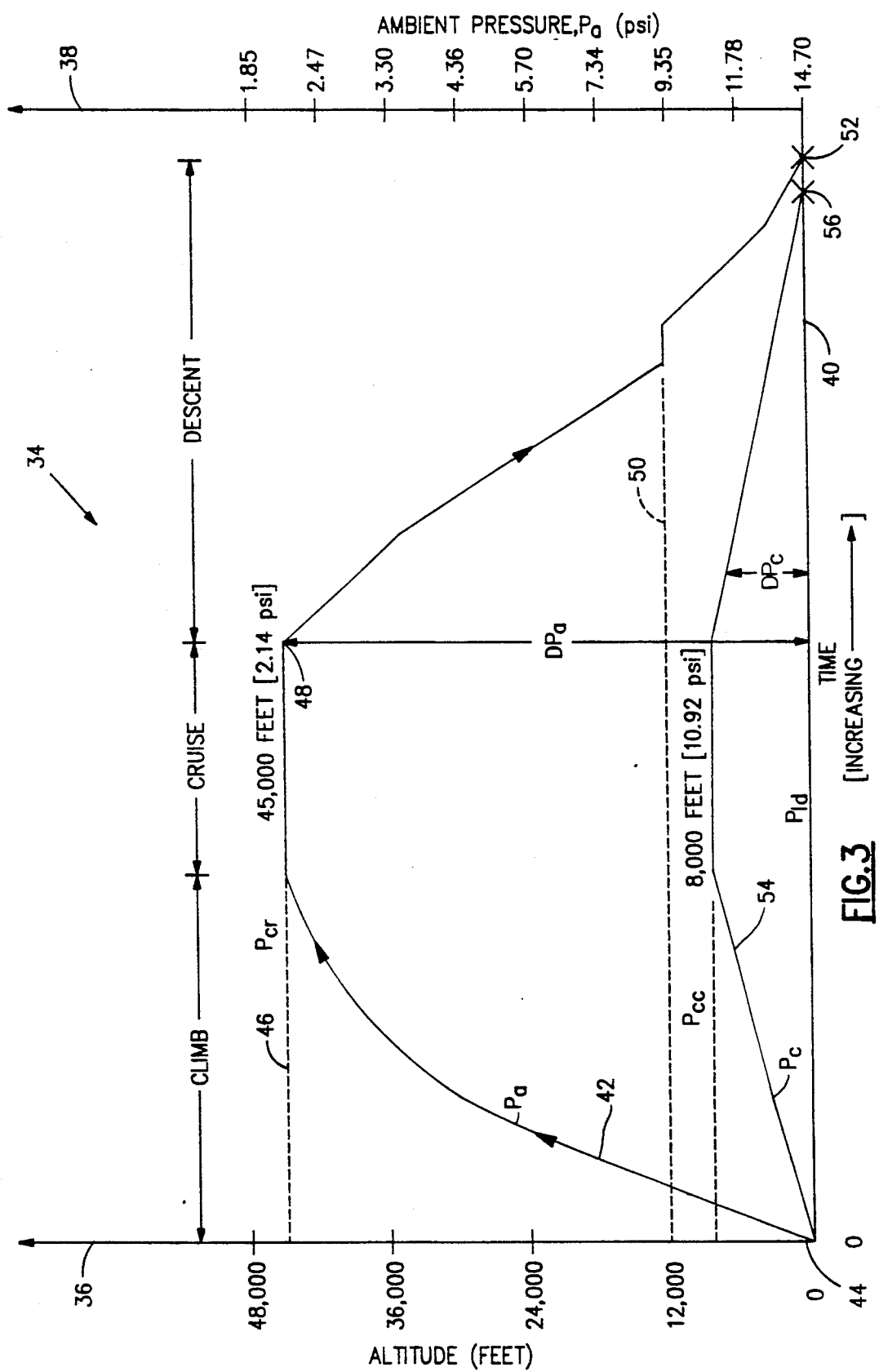
FIG. 3 is a functional diagram used in the description of the logical steps of FIG. 2.

FIG. 3 is an illustration 34 of a typical aircraft flight profile from which equations for $P_r$ during ascent and decent can be derived. Altitude 36 and ambient pressure (i.e., $P_a$) 38 are plotted along the vertical axes versus time 40 on the horizontal axis. The aircraft flies along a curve 42 which represents altitude and ambient pressure versus aircraft flight time. The aircraft takes off at a point 44 and climbs along the curve 42 to a cruise altitude 46 and levels off. The aircraft then enters the cruise phase of the flight flying at substantially constant altitude. When the aircraft reaches a point 48 it starts the descent phase of the flight. The aircraft descends until it levels off at an altitude 50 for a short while, usually due to air traffic control instructions, and then starts the descent again until the aircraft lands at a landing field point 52. The pressure at the landing field is $P_{ld}$.

During the flight $P_c$ is changing along a curve 54 under the control of the controller 12 as a function of $P_a$. At the aircraft maximum operating altitude of 45,000 feet, $P_c$ reaches a maximum of 8,000 feet. When the aircraft starts to descend from its cruising altitude of 45,000 feet, the cabin starts to descend from its pressurized value of 8,000 feet.

The cabin typically lands at a point 56 before the aircraft landing point 52. This ensures $P_c$ is at a slightly higher pressure than $P_a$ when the aircraft lands, thereby allowing the aircraft doors to be opened easier in case of an emergency.

During the non-linear ascent and descent of the aircraft along the curve 42, it is desirable that the rate of change of $P_c$ with respect to time be constant (i.e., $C_f=0$). This is particularly true during the descent phase where the human ear is more sensitive to pressure changes, and hence a reduced, linear, cabin pressure rate of change leads to an increase in passenger comfort. An exemplary constant cabin pressure rate of change during a descent is approximately −300 feet per minute (fpm). While an exemplary constant cabin pressure rate of change during an ascent is approximately 500 fpm.

The controller limits the rate of change of $P_c$ during ascent and descent by monitoring $DP_c$ and $DP_a$. As mentioned hereinbefore the general form of the equation equated to $P_r$ is determined based upon the typical aircraft descent or ascent profile, and it relates the non-linearity of the actual aircraft ascent/descent to the desired linear ascent/descent of the aircraft cabin.

Figure 4:
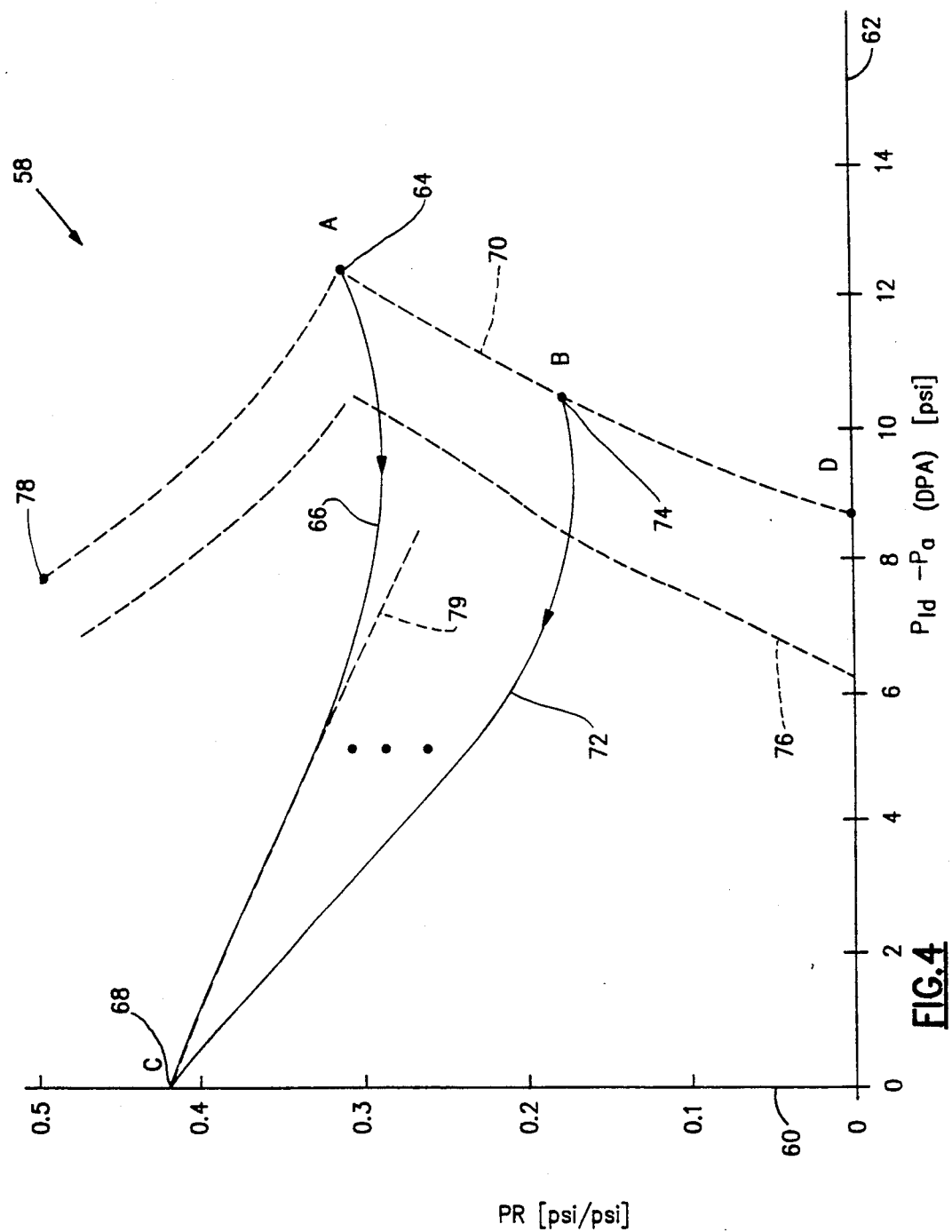
FIG. 4 is another functional diagram used in the description of the logical steps of FIG. 2.

Referring still to FIG. 3, during the descent starting at the point 48, the ratio $DP_c/DP_a$, can be plotted as a function of $DP_a$. The result of such a plot is FIG. 4. FIG. 4 is a plot 58 of $P_r$ along the vertical axis 60, versus $[P_{ld}-P_a]$ (i.e., descent $DP_a$) along the horizontal axis, 62. While operating at 45,000 feet with an 8,000 foot cabin, the aircraft starts its descent from a point A 64 and follows a first descent curve 66 until reaching a point C 68, which represents the landing field. At point C 68, the aircraft is on the ground so $DP_a$ is equal to zero. The curve 66 was derived by plotting the values of $DP_c/DP_a$ from FIG. 3 as a function of $DP_a$. As an example referring back to FIG. 3, the value of $DP_c/DP_a$ at the point 48 equals 0.30 psi/psi which corresponds to the value of $DP_a$ equal 12.56 psi. These values define the point A 64 of FIG. 4. Repeating this procedure for a plurality of points along the curve 42 (FIG. 3) during the descent phase of the flight defines the curve 66 in FIG. 4.

If the aircraft starts its descent from an altitude of less than its maximum operating altitude of 45,000 feet, then $P_r$ is defined by a curve other than the first descent curve 66. In general, there are a plurality of curves (not shown) each starting from a locus 70 of possible descent starting points and each ending at a particular landing field point (e.g., point C 68). An example of one of these plurality of curves is a curve 72 which represents a descent starting from a point B 74 to the landing field point C 68. Point B 74 represents a situation where the aircraft fuselage has a maximum differential pressure across it while operating at an altitude less than the aircraft's maximum operating altitude. For situations where the aircraft fuselage is not experiencing a maximum pressure differential, a locus of possible starting points is a second locus 76.

Another possible locus of descent starting points is defined by a locus running from the point A to a point E 78. This locus represents the situation in which the aircraft cabin is at 8,000 feet while the aircraft is at an altitude below its maximum operating altitude (e.g., 45,000 feet).

Once a curve for $P_r$ is known by plotting a sufficient number of points, an equation for $P_r$ can be derived which defines the family of curves originating from a point along the locus of starting points (e.g., 70 and 76) and terminating at the landing field (e.g., point C 68). The equation for $P_r$ can be derived using known curve fitting techniques, or one may empirically derive an equation for $P_r$ based on the curve 66. In general the higher order the equation for $P_r$, the less error there will be in the curve fit equation. In this embodiment a second order equation for $P_r$ is used, which is defined as:

$$P_r = [C_2 - (M \cdot DP_a) + K_2 \cdot (DP_a - C_3)^2] \quad \text{(Eq. 3)}$$

where:
$C_2$ = unitless
$C_3$ = psi
$K_2$ = 1/(psi)$^2$
M = ascent/descent starting point factor.
Note: $C_2$, $C_3$ and $K_2$ are constant values.
This equation characterizes curves 66 and 72, and the plurality of curves (not shown) indicative of a reduced, linear, cabin pressure rate of change during a descent.

A line 79 tangential to a portion of the curve 66 is characterized by the equation for M. M (the ascent/descent starting point factor) is the coefficient for the term raised to the first power of $DP_a$ in Eq. 3. The line 79 varies based upon the starting point of the descent (e.g., A 64) and the end point of the descent (e.g., C 68). For a descent, M is a function of the descent starting point (e.g., point A 64) from the locus of possible starting points. Therefore M is only computed once, at the start of the descent, and its value is retained until the descent is completed. Similarly for an ascent, M is computed once at the start of the ascent as a function of the ascent starting point. M provides "memory" in Eq. 3 of the ascent or descent starting point. The equation for M is derived by substituting Eq. 3 into Eq. 2 and solving for M when $C_f$ is set equal to zero, which yields:

$$M = [C_2 + K_2 \cdot (DP_a - C_3)^2 - K_1 \cdot (DP_c/DP_a)]/DP_a \quad \text{(Eq. 4)}$$

Figure 5:
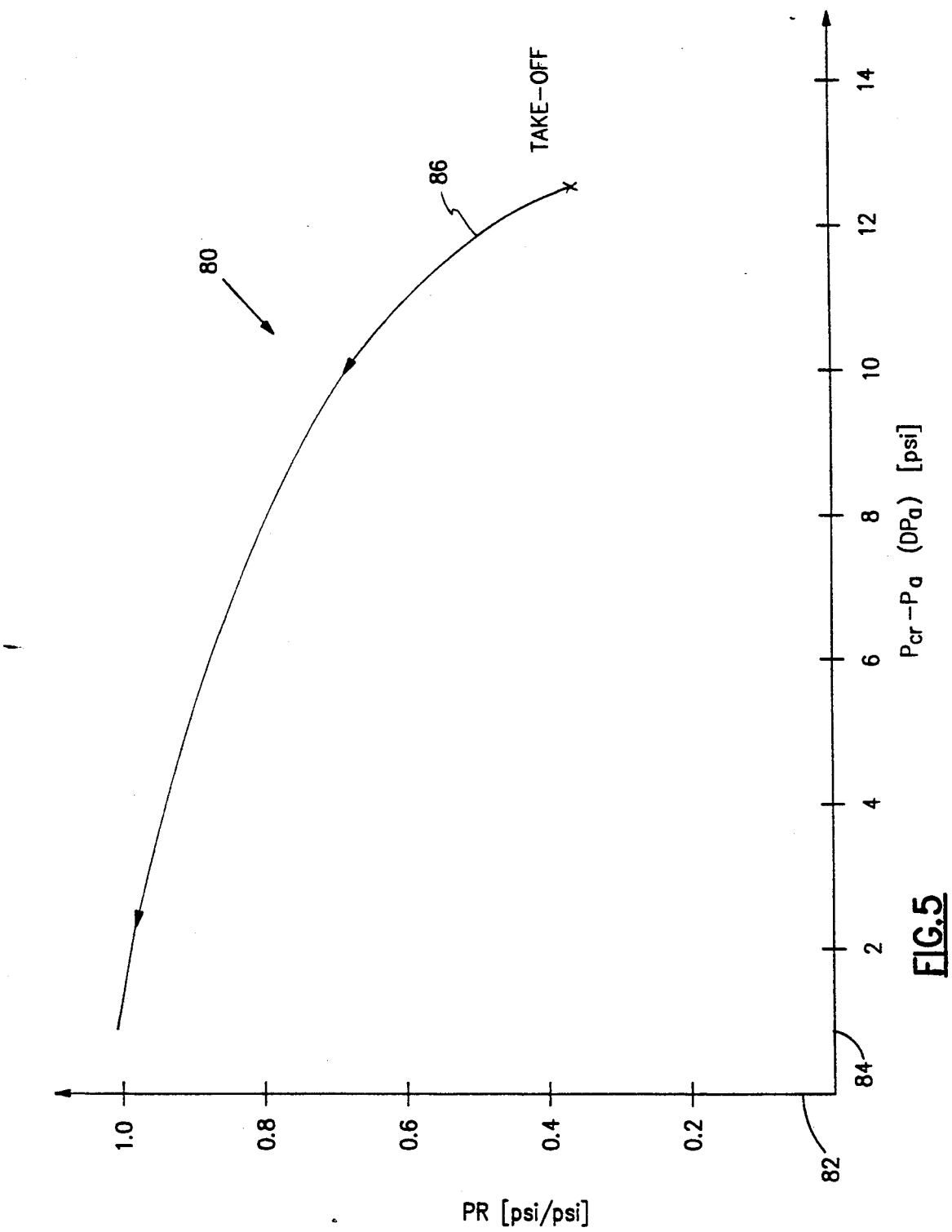
FIG. 5 is another functional diagram used in the description of the logical steps of FIG. 2 during an aircraft ascent.

With respect to an ascent, FIG. 5 illustrates a plot 80 of the ratio $DP_c/DP_a$ along a vertical axis 82, and $DP_a$ along a horizontal axis 84 during the ascent phase of the aircraft flight along the curves 42, 54 (FIG. 3). Plotting the ratio $DP_c/DP_a$ as a function of $DP_a$ as the aircraft ascends from a point 44 (FIG. 3) to the cruising altitude 46 results in a curve 86. The curve 86 is just one example of an ascent curve, and as such it should be understood that there are a family of ascent curves based upon the starting and ending points of the aircraft ascent. An explanation will now be presented of how the present invention computes a rate limit set point for the cabin pressure rate of change.

Figure 2:
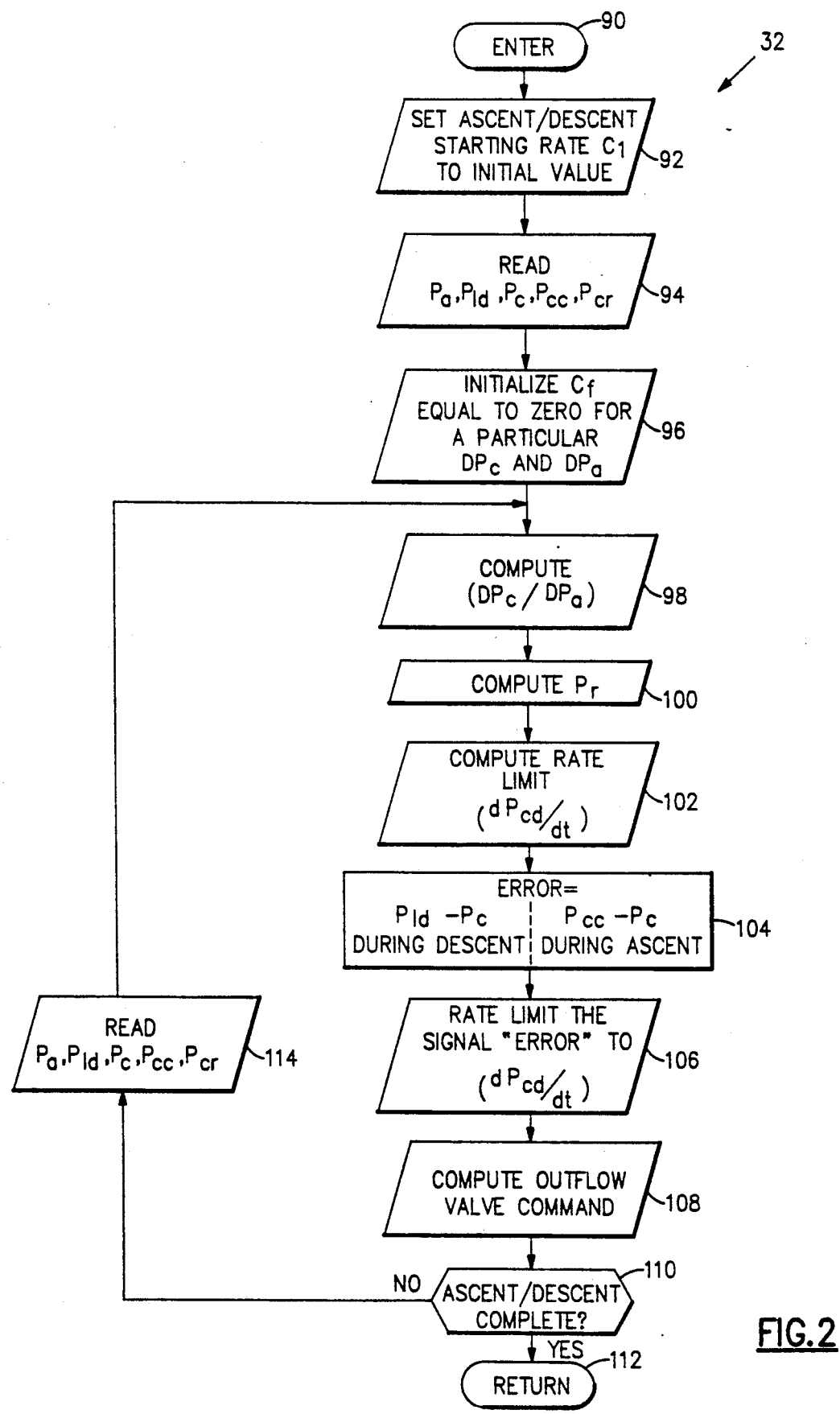
FIG. 2 is a flow chart diagram of logical steps executed by the embodiment of FIG. 1.

In FIG. 2 is illustrated logic 32 stored in the memory 16 and executed by the microprocessor 14 to control the cabin pressure rate of change during aircraft descents and ascents. Upon entering the logic 32 at a step 90, the ascent/descent starting rate $C_1$ is set to an initial value for the limit of the rate of cabin pressure change (e.g., −300 ft/min for descent, and 500 ft/min for ascent) in a subroutine 92. A subroutine 94 is then performed to read the five pressure signals: $P_a$, $P_c$, $P_{cr}$, $P_{cc}$ and $P_{ld}$. Next a subroutine 96 is performed to initialize the correction factor $C_f$ to zero by computing the ascent/descent starting point factor, M at the start of the ascent or descent. Subroutine 96 computes M as defined in Eq. 4 for the particular $DP_a$ and $DP_c$ at which the ascent or descent is starting. Note that if Eqs. 3–4 are substituted into Eq. 2, the resultant is that $C_f$ will equal zero. Therefore, computing M at the particular ascent/descent starting point, results in the correction factor $C_f$ being initialized to zero.

The logic 32 performs a subroutine 98 next to compute the ratio $(DP_c/DP_a)$, followed by subroutine 100 which computes the set point value for the ratio, $P_r$ as defined in Eq. 3. Note, the value for M computed in subroutine 96 is used in Eq. 3. Subroutine 102 is performed next to calculate $d(P_{cd})/dt$ defined in Eq. 5. A step 104 is then performed to compute an error signal indicative of the difference between $P_{ld}$ and $P_c$ during a descent, and $P_{cc}$ and $P_c$ during an ascent. The rate of change of the error signal is then rate limited in a subroutine 106. The set point for the rate limit of subroutine 106 is the value of $d(P_{cd})/dt$ computed in subroutine 102. A rate limited error signal is then provided to a subroutine 108 which computes an outflow valve command to control the variable flow area of the outflow valve 13 (FIG. 1).

The next step in FIG. 2 is to determine if the descent (or ascent) is complete. This determination is performed by a test 110 using the signal on the line 31 (FIG. 1) which is indicative of whether the ascent or descent has been completed. This signal is typically provided by a weight-on-wheels detector or the aircraft flight management system (FMS). If the ascent/descent has been completed a return step 112 is executed. Otherwise, a subroutine 114 is performed which reads the most recent values of $P_a$, $P_c$, $P_{cc}$, $P_{cr}$ and $P_{ld}$, followed by recursive execution at subroutine 98 again.

Figure 6:
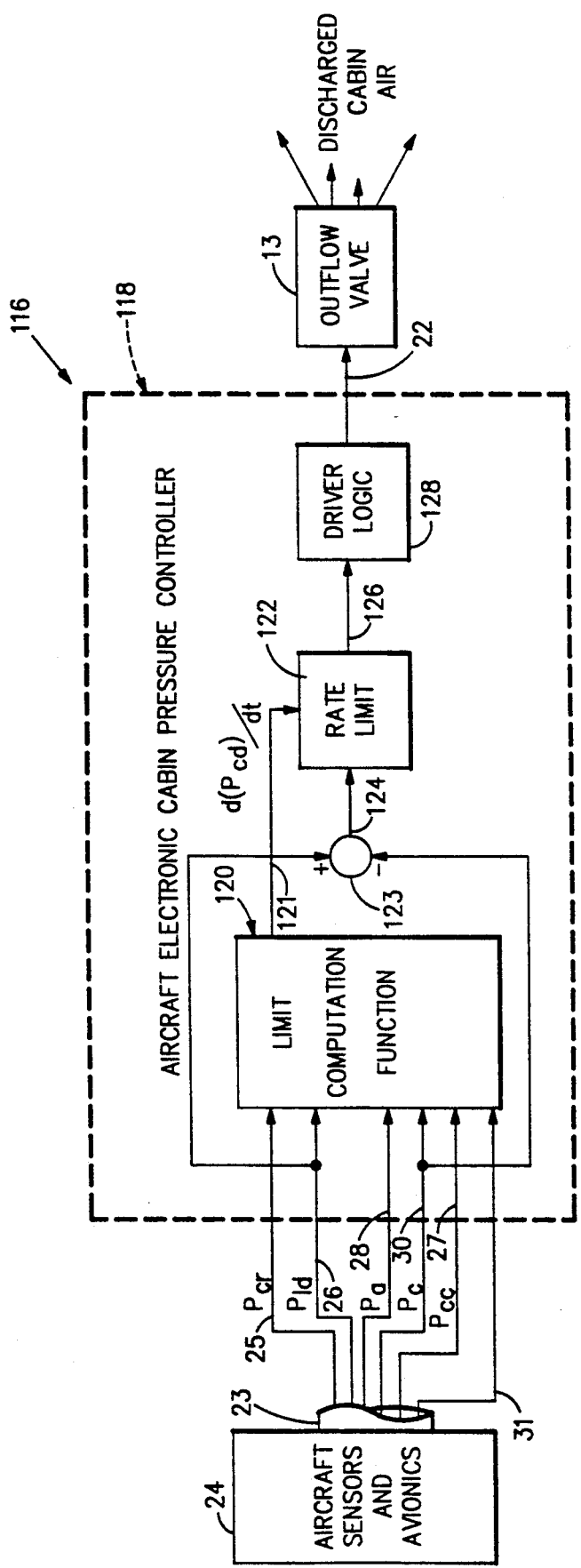
FIG. 6 is a functional block diagram of an alternative embodiment of the electronic cabin pressure controller of FIG. 1.

An alternative embodiment 116 of the present invention for an aircraft descent is illustrated in FIG. 6. The alternative embodiment includes an electronic controller 118 which provides the outflow command signal on the line 22 to the outflow valve 13. The controller 118 includes a limit computation function 120 which receives $P_a$, $P_c$, $P_{cr}$, $P_{cc}$ and $P_{ld}$ and provides the adjustable rate limit set point on a line 121 to a rate limit function 122. The limit computation function 120 computes the adjustable rate limit set point using the same equations as disclosed in Eqs. 1-5, and can be embodied in either analog or digital electronics. A summing function 123 computes the difference between $P_{ld}$ and $P_c$, and provides a signal indicative thereof on a line 124. The signal on the line 124 is similar to the error signal computed in step 104 (FIG. 2) of the first embodiment. The rate limit function 122 operates in a well known manner to limit the rate of change of the signal on the line 124 if the rate exceeds the magnitude of the adjustable limit signal on the line 121. The rate limit function provides a rate limited signal on a line 126 to a driver logic function 128 which computes and provides the outflow command signal on the line 22 to the outflow valve 13.

It should be understood that the scope of this invention is not limited to the specific equations presented hereinbefore or to the exact order of the steps executed in the flow chart of FIG. 2. Rather the equations are readily computable based upon the typical ascent and descent profile of a specific aircraft type. Similarly, the steps of FIG. 2 may be performed several ways and additions may be made thereto in the practice of the present invention. It should also be noted that in the interest of clarity in FIG. 3, an assumption was made that the pressure at the takeoff and landing points were equal. Clearly the present invention is not so limited.

Figure 7:
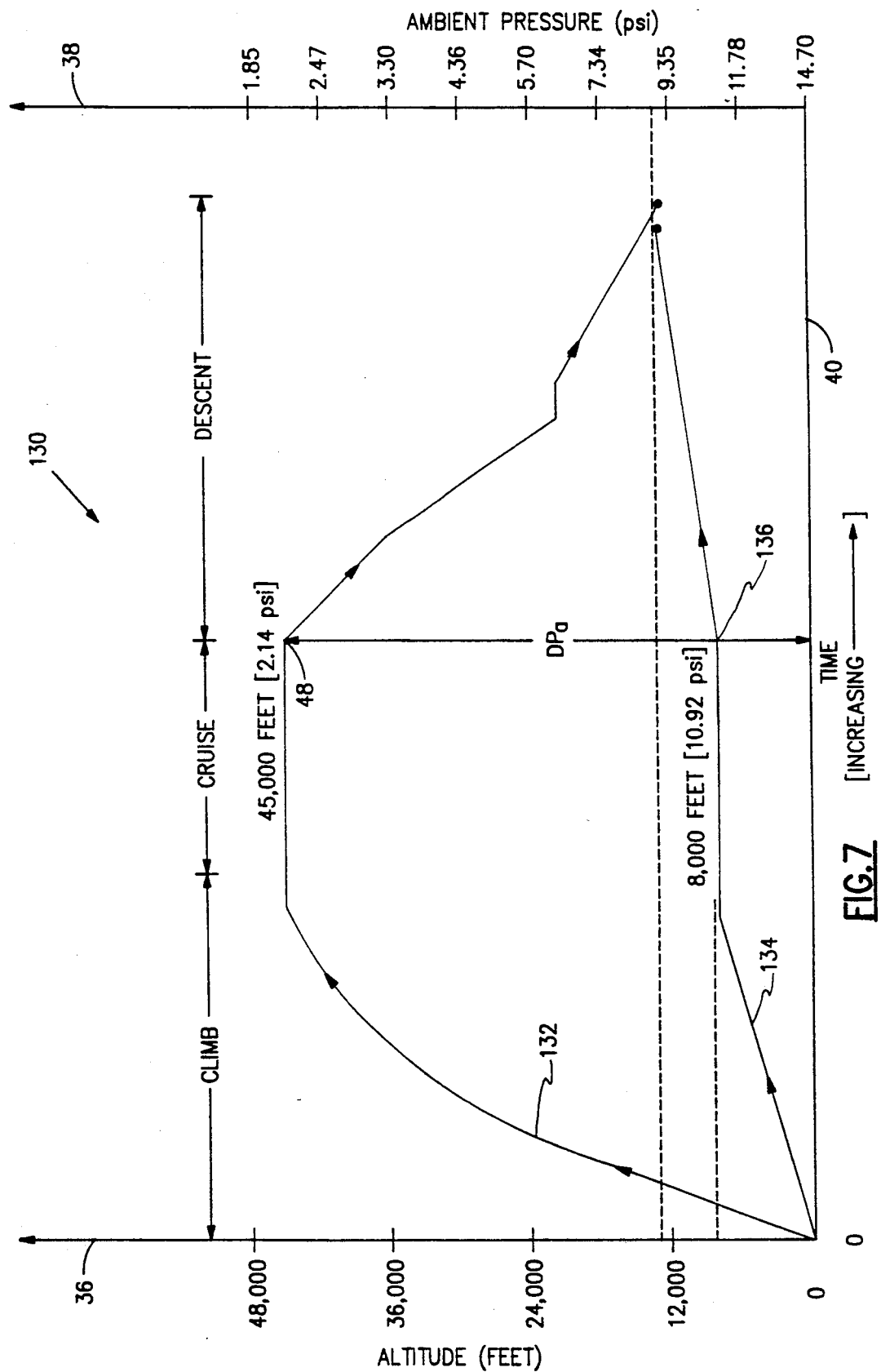
FIG. 7 is yet another functional diagram used in the description of the logical steps of FIG. 2.

The present invention will also control cabin pressure at a reduced, linear rate even in a situation where the aircraft cabin pressure has to be reduced in preparation for landing. Such a situation occurs during aircraft approaches to high altitude airports such as Kennedy International Airport in LaPaz, Mexico whose elevation is 13,392 feet above sea level. In this situation the aircraft cabin altitude of 8,000 feet during a cruise has to be increased during descent since the landing field altitude is 13,392 feet. FIG. 7 is an illustration 130 such a descent; the aircraft flies along a curve 132 and the aircraft cabin flies along a curve 134. Note, that during the aircraft descent, the cabin pressure beginning at a point 136 starts to decrease rather than increase in preparation for landing at an airport whose elevation is greater then 8,000 feet. Similarly during an ascent from a high airport (e.g., LaPaz), rather than the cabin pressure being reduced during the climb, cabin pressure will be increased since maximum cabin cruising altitude is 8,000 feet while the departure airport altitude is greater then 8,000 feet.

Figure 8:
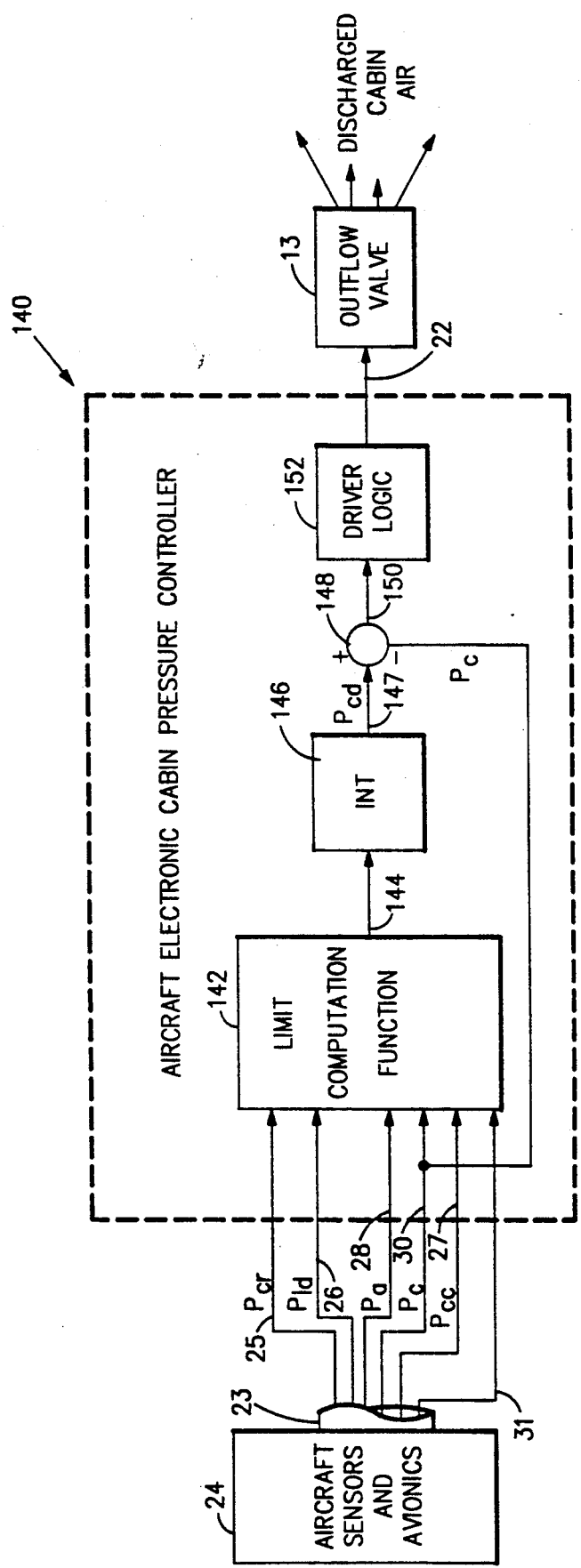
FIG. 8 is a functional block diagram of a closed loop alternative embodiment of the electronic cabin pressure controller of FIGS. 1.

The present invention can also be utilized in a closed loop control system, rather than the open loop systems of the first and second embodiments presented hereinbefore. As illustrated in FIG. 8 a closed loop embodiment 140 includes a set point computation function 142 which schedules a set point for the cabin pressure rate of change and provides a signal indicative thereof on a line 144 to an integrator 146. The integrator integrates over time to provide a desired cabin pressure signal $P_{cd}$ on a line 147 which is compared to $P_c$ by a summing function 148, and an error signal indicative of the difference is provided on a line 150 to driver logic 152. The driver logic contains the necessary compensation (e.g., proportional and integral paths) to condition the error signal and provide a command signal responsive thereto on the line 22.

Figure 9:
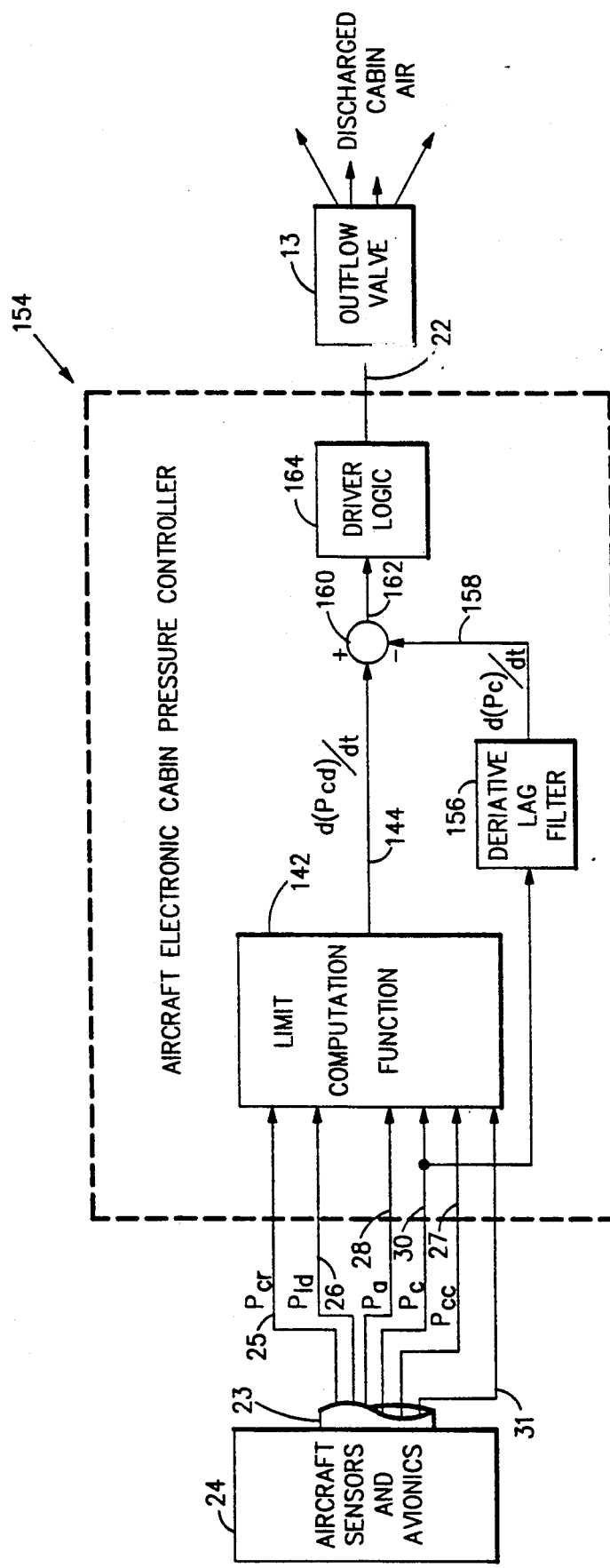
FIG. 9 is an functional block diagram of yet another alternative embodiment of the electronic cabin pressure controller of FIG. 1.

Yet another embodiment 154 of the invention is illustrated in FIG. 9. In this embodiment the cabin pressure signal $P_c$ on the line 30 is input to a derivative/lag filter which provides a signal on a line indicative of the rate of change of actual cabin pressure, i.e. $d(P_c)/dt$. A summing function 160 then computes the difference between the actual and desired rates of cabin pressure change, and provides an error signal indicative of the difference on a line 162. The error signal is input to a driver logic function 164 which provides a command signal on the line 22 to the outflow valve 13.

All the foregoing changes and variations are irrelevant to the invention, it suffices an adjustable set point for cabin air pressure during ascent and descent is computed and used to control the actual aircraft cabin pressure rate of change. The adjustable set point value is computed throughout the aircraft ascent/descent as a function of $P_a$, $P_{ld}$, $P_{cr}$, $P_{cc}$, $P_c$ and the ascent/descent starting point to provide a reduced, linear, cabin pressure rate of change during nonlinear aircraft ascents and descents.

Although the present invention has been shown and described with respect to a best mode embodiment thereof, it should be understood by those skilled in the art that various other changes, omissions and additions to the form and detail thereof, may be made therein without departing from the spirit and scope of the invention.

I claim:

1. A method for providing an adjustable rate set point reference for use in a cabin pressure controller to control the rate of change of air pressure in an aircraft cabin during aircraft ascents and descents in response pressure values, including: aircraft landing site pressure $P_{ld}$, ambient pressure outside the aircraft $P_a$, actual aircraft cabin pressure $P_c$, ambient pressure at cruise altitude $P_{cr}$, and cabin pressure at cruise altitude $P_{cc}$, comprising the steps of:

computing at successive time intervals during the ascent and descent a ratio $DP_c/DP_a$ which is equal to $P_{ld}/(P_{ld}-P_a)$ during a descent, and is equal to $(P_{cc}-P_c)/(P_{cr}-P_a)$ during an ascent;

scheduling at each successive time interval a set point value $P_r$, during aircraft ascent said set point value is a function of $P_{ld}-P_a$) and the pressure values at the start of the start of the ascent, during aircraft descent said set point value is a function of $(P_{cr}-P_a)$ and the pressure values at the start of the descent;

computing at each successive time interval the difference between said ratio $DP_c/DP_a$ and said set point value, and providing an error signal indicative of the difference; and calculating at each successive time interval said adjustable rate set point reference by summing said error signal and a constant value selectable as a function of whether the aircraft cabin is ascending or descending, such that the controller acts to drive the actual cabin pressure rate of change towards said adjustable rate set point.

2. The method of claim 1, wherein: said step of scheduling is performed by equating $P_r$ to a quantity $[C_2-(M*DP_a)+K_2*(DP_a-C_3)^2]$ where $C_2$, $C_3$, $K_2$ and M are all constant values.

3. The method of claim 2, the step of scheduling comprises the step of:

computing a value for M by equating M to a quantity $[C_2+K_2*(DP_a-C_3)^2-(DP_c/DP_c)]/DP_a$ at the start of an ascent or descent.

4. An aircraft cabin pressure controller which receives sensed information indicative of ambient air pressure outside the aircraft $P_a$, pressure inside the aircraft cabin $P_c$, and pressure at the aircraft landing site $P_{ld}$, ambient pressure at cruise altitude $P_{cr}$, and cabin pressure at cruise altitude $P_{cc}$, comprising:

means for computing at successive intervals during ascent and descent of the aircraft, a ratio which is equal to $(P_{ld}-P_c)/(P_{ld}-P_a)$ during descent of the aircraft cabin, and which is equal to $(P_{cc}-P_c)/(P_{cr}-P_a)$ during ascent of the aircraft cabin;

means for scheduling at successive intervals during ascent and descent a set point value $P_r$ which during descent is a function of $P_a$, $P_c$, $P_{ld}$ and the descent starting point, for scheduling said set point value during an ascent as a function of $P_a$, $P_c$, $P_{cc}$, $P_{cr}$ and the ascent starting point, and for providing a signal indicative of said set point value $P_r$;

means for computing the difference between said ratio signal and said set point value signal $P_r$, and for providing an error signal indicative thereof; and means for summing said error signal and a constant value to provide an adjustable rate set point signal for controlling the cabin pressure rate of change, said constant value is indicative of the initial cabin pressure rate of change desired at the start of an ascent or descent.

5. The aircraft cabin pressure controller of claim 4, further comprising:

means for computing the difference between the landing field pressure $P_{ld}$ and the cabin pressure $P_c$ during a descent, and for computing the difference between $P_c$ and the desired cabin pressure during cruise $P_{cc}$, and for providing a difference signal indicative thereof; and means responsive to said difference signal and said adjustable rate set point signal, for limiting the magnitude of the rate of change of said difference signal, and for providing a limited signal indicative thereof, such that the magnitude of said limited signal is limited to values less than said adjustable rate set point signal.

6. The aircraft cabin pressure controller of claim 4, further comprising:

means for integrating over time said adjustable rate set point signal, and for providing an integrated signal indicative thereof;

means for comparing said integrated signal and said cabin pressure signal $P_c$, and for proving a pressure error signal indicative thereof.

7. The aircraft cabin pressure controller of claim 4, further comprising:

means responsive to said cabin pressure signal $P_c$, for computing the time rate of change of said cabin pressure signal $P_c$, and for providing a cabin pressure rate of change signal $d(P_c)/dt$ indicative thereof; and means for computing the difference between said adjustable rate set point signal and said cabin pressure rate of change signal $d(P_c)/dt$, and for providing a rate of change error signal indicative of the difference.

8. The aircraft cabin pressure controller of claim 4, wherein said means for scheduling comprises means for equating said desired value $P_r$ equal to an equation $[C_2-(M*DP_a)+K_2*(DP_a-C_3)^2]$ where $C_2$, $C_3$, $K_2$ and M are constant values.

9. The aircraft cabin pressure controller of claim 8, further comprising:

means responsive to said adjustable rate set point signal, for integrating over time said commanded rate of aircraft cabin pressure change, and for providing a commanded aircraft cabin pressure signal; and means for summing said commanded aircraft cabin pressure signal and the sensed aircraft cabin pressure $P_c$, and for providing a cabin pressure error signal indicative thereof.

10. The cabin pressure controller of claim 5, further comprising:

valve means having a variable flow area, for receiving pressurized aircraft cabin air, for discharging a variable amount of the pressurized cabin air to ambient air external in response to an outflow command signal and means responsive to said adjustable rate set point signal, for controlling said variable flow area by computing and providing said outflow command signal to said valve means, such that said variable area is modulated in response to said adjustable rate set point signal.

* * * * *